(12) United States Patent
Ayuzawa (10) Patent No.: US 11,014,614 B2
(45) Date of Patent: May 25, 2021

(54) BODY STRUCTURE OF AUTOMOBILE

(71) Applicant: HONDA MOTOR CO., LTD., Tokyo (JP)

(72) Inventor: Shotaro Ayuzawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 115 days.

(21) Appl. No.: 16/338,816

(22) PCT Filed: Jul. 31, 2017

(86) PCT No.: PCT/JP2017/027734
§ 371 (c)(1),
(2) Date: Apr. 2, 2019

(87) PCT Pub. No.: WO2018/078989
PCT Pub. Date: May 3, 2018

(65) Prior Publication Data
US 2020/0039586 A1 Feb. 6, 2020

(30) Foreign Application Priority Data

Oct. 27, 2016 (JP) .............................. JP2016-210477

(51) Int. Cl.
*B62D 25/08* (2006.01)
*B62D 25/06* (2006.01)
(Continued)

(52) U.S. Cl.
CPC ............. *B62D 25/08* (2013.01); *B62D 25/06* (2013.01); *B62D 25/20* (2013.01);
(Continued)

(58) Field of Classification Search
CPC . B62D 25/08; B62D 25/2036; B62D 25/2027
(Continued)

(56) References Cited

U.S. PATENT DOCUMENTS 5,641,194 A * 6/1997 Honma ................ B62D 21/157
296/187.12
7,287,797 B1 * 10/2007 Belloso .................. B62D 21/03
296/181.2
(Continued)

FOREIGN PATENT DOCUMENTS

CN 104085451 A 10/2014
CN 104290819 A 1/2015
(Continued)

OTHER PUBLICATIONS

International Search Report dated Aug. 29, 2017, issued in counterpart application No. PCT/JP2017/027734, w/ English translation (5 pages).
(Continued)

*Primary Examiner* — Jason S Morrow
(74) *Attorney, Agent, or Firm* — Westerman, Hattori, Daniels & Adrian, LLP (57) ABSTRACT

A body structure of an automobile is provided in which a body floor includes a floor panel having a bulge portion bulging upward formed on the rear part on opposite side parts in the vehicle width direction, and a side member disposed in the fore-and-aft direction along the upper face on opposite side parts in the vehicle width direction of the floor panel and having integrally formed therewith the rear pillar rising upward from the upper face of the bulge portion. Due to the mounting structure of a rear side frame and the roof side rail support member, it is possible to enhance the strength and stiffness of the rear part of the body floor made of CFRP by the bulge portion and the rear pillar and to strongly mount the rear side frame and the roof side rail support member on the rear part of the body floor.

6 Claims, 6 Drawing Sheets

(51) Int. Cl.
    *B62D 25/20*     (2006.01)
    *B62D 27/06*     (2006.01)
    *B62D 29/04*     (2006.01)
    *B62D 21/11*     (2006.01)

(52) U.S. Cl.
CPC ..... *B62D 25/2027* (2013.01); *B62D 25/2036* (2013.01); *B62D 27/065* (2013.01); *B62D 29/04* (2013.01); *B62D 21/11* (2013.01)

(58) Field of Classification Search
USPC .......................... 296/193.08, 203.04, 193.07
See application file for complete search history.

(56) References Cited

U.S. PATENT DOCUMENTS

| | | | |
|---|---|---|---|
| 9,033,404 B2 | 5/2015 | Meaige et al. | |
| 10,167,019 B2 | 1/2019 | Ayuzawa et al. | |
| 2015/0061320 A1* | 3/2015 | Yabu | B62D 25/082 |
| | | | 296/187.1 |
| 2015/0137558 A1* | 5/2015 | Ayuzawa | B62D 25/082 |
| | | | 296/193.07 |
| 2015/0375800 A1 | 12/2015 | Wagner et al. | |
| 2016/0251038 A1 | 9/2016 | Kawata et al. | |
| 2017/0073020 A1* | 3/2017 | Ayuzawa | B32B 3/08 |
| 2017/0137066 A1* | 5/2017 | Ayuzawa | B62D 25/025 |
| 2017/0297633 A1* | 10/2017 | Ayuzawa | B62D 29/043 |
| 2017/0361875 A1* | 12/2017 | Ayuzawa | B62D 25/025 |
| 2018/0134317 A1* | 5/2018 | Gerhardt | B60J 1/002 |
| 2018/0186411 A1* | 7/2018 | Ast | B62D 29/005 |
| 2018/0312197 A1* | 11/2018 | Takahashi | B62D 25/2018 |
| 2020/0079437 A1* | 3/2020 | Kim | B62D 25/08 |
| 2020/0231217 A1* | 7/2020 | Murata | B62D 25/08 |

FOREIGN PATENT DOCUMENTS

| | | |
|---|---|---|
| CN | 205010328 U | 2/2016 |
| JP | 2003-104239 A | 4/2003 |
| JP | 2008-105540 A | 5/2008 |
| JP | 2014-91461 A | 5/2014 |
| JP | 5527178 B2 | 6/2014 |
| JP | 2014-136436 A | 7/2014 |
| JP | 2015-189255 A | 11/2015 |
| JP | 2015-196388 A | 11/2015 |
| WO | 2011/128081 A1 | 10/2011 |
| WO | 2015/056667 A1 | 4/2015 |
| WO | 2016/031337 A1 | 3/2016 |

OTHER PUBLICATIONS

Office Action dated Oct. 23, 2019, issued in counterpart JP Application No. 2018-547132 (5 pages).

Office Action dated Nov. 30, 2020, issued in counterpart CN Application No. 201780065276.X. (6 pages).

* cited by examiner

BODY STRUCTURE OF AUTOMOBILE

TECHNICAL FIELD

The present invention relates to a body structure of an automobile in which left and right rear side frames and roof side rails are mounted on a rear part of a body floor made of CFRP.

BACKGROUND ART

An arrangement in which a suspension member 84 having a closed cross-section and extending in the vehicle width direction is provided on a rear part of a body floor of an automobile, and left and right rear suspensions are supported on the suspension member 84 is known from Patent Document 1 below.

RELATED ART DOCUMENTS

Patent Documents

Patent Document 1: Japanese Patent No. 5527178

SUMMARY OF THE INVENTION

Problems to Be Solved by the Invention

When a pair of left and right rear side frames extending in the fore-and-aft direction are supported on a rear part of a body floor of an automobile and a pair of left and right roof side rails extending in the fore-and-aft direction are supported above the rear side frame, in a structure in which a rear wall of the suspension member 84 described in Patent Document 1 above is extended upward and the front end of a roof side rail is supported on the upper end of the rear wall, there is a possibility that the strength and stiffness of a mounting part of the roof side rail will become insufficient.

The present invention has been accomplished in light of the above circumstances, and it is an object thereof to enhance the strength and stiffness of a portion via which a rear side frame and a roof side rail are supported on a rear part of a body floor made of CFRP.

Means for Solving the Problems

In order to attain the above object, according to a first aspect of the present invention, there is provided a body structure of an automobile in which left and right rear side frames and left and right roof side rails are mounted on a rear part of a body floor made of CFRP, wherein the body floor comprises a floor panel having a bulge portion bulging upward formed on a rear part of opposite side parts in a vehicle width direction, and a side member disposed in a fore-and-aft direction along an upper face of the opposite side parts in the vehicle width direction of the floor panel and having formed integrally therewith a rear pillar rising upward from an upper face of the bulge portion, a front end of the rear side frame is mounted on the rear part of the bulge portion, and a roof side rail support member supporting the roof side rail is mounted on an upper part of the rear pillar.

Further, according to a second aspect of the present invention, in addition to the first aspect, the bulge portion comprises a hollow part formed between an outer skin and an inner skin of the floor panel, and the rear side frame is fastened by a screw to a first metal insert member disposed within the hollow part and having a triangular shape when viewed from a side.

Furthermore, according to a third aspect of the present invention, in addition to the second aspect, the rear pillar comprises a hollow part formed between an outer skin and an inner skin of the side member, and the roof side rail support member is fastened by a screw to a second metal insert member disposed within the hollow part.

Moreover, according to a fourth aspect of the present invention, in addition to the third aspect, a mounting bracket whose upper part is inclined rearward is provided on an inner face in the vehicle width direction of the left and right rear pillars, opposite side parts in the vehicle width direction of a back panel rising from a rear end of the floor panel are fixed to the mounting bracket, and a support bracket for a seat belt take-up device is provided at an upper front position of the mounting bracket on the inner face in the vehicle width direction of the rear pillar.

Further, according to a fifth aspect of the present invention, in addition to the fourth aspect, the body structure comprises left and right upper frames extending rearward from an upper end of the left and right the rear pillar, and left and right suspension struts connecting the left and right upper frames and the left and right rear side frames in an up-and-down direction, the front end of the rear side frame is fastened by a screw to two faces oriented in different inward and outward directions in the vehicle width direction of the first metal insert member, and a front end of the upper frame is fastened by a screw to two faces oriented in different inward and outward directions in the vehicle width direction of the second metal insert member.

Furthermore, according to a sixth aspect of the present invention, in addition to the fifth aspect, the left and right upper frames are linked by an upper cross member extending in the vehicle width direction via an upper end of the left and right suspension struts, and the left and right rear side frames are linked by a lower cross member extending in the vehicle width direction via a lower end of the left and right suspension struts.

Moreover, according to a seventh aspect of the present invention, in addition to the fifth aspect, a middle part in the vehicle width direction of an upper end of the back panel and the upper end of the left and right suspension struts are linked via a brace that opens out in a V-shape in going rearward.

Further, according to an eighth aspect of the present invention, in addition to the sixth aspect, a middle part in the vehicle width direction of the lower cross member and the upper end of the left and right suspension struts are linked via a brace that opens out in a V-shape in going upward.

It should be noted here that a roll bar 41 of an embodiment corresponds to the roof side rail support member of the present invention.

Effects of the Invention

In accordance with the first aspect of the present invention, the body floor made of CFRP includes the floor panel having the upwardly bulging bulge portion formed on the rear part on opposite side parts in the vehicle width direction, and the side member disposed in the fore-and-aft direction along the upper face on opposite side parts in the vehicle width direction of the floor panel and having integrally formed therewith the rear pillar rising upward from the upper face of the bulge portion. Since the front end of the rear side frame is mounted on the rear part of the bulge portion, and the roof side rail support member supporting the roof side rail is mounted on the upper part of the rear pillar, it is possible to enhance the strength and stiffness of the rear part of the body floor made of CFRP by means of the bulge portion and the rear pillar and to strongly mount the rear side frame and the roof side rail support member on the rear part of the body floor, thus enabling the weight of a vehicle body to be lightened when applied to a sports car or a convertible car in particular.

Furthermore, in accordance with the second aspect of the present invention, since the bulge portion includes a hollow part formed between the outer skin and the inner skin of the floor panel, and the rear side frame is fastened by a screw to the first metal insert member having a triangular shape when viewed from the side and disposed in the hollow part, it becomes possible to fasten the rear side frame to the bulge portion from the outside of the vehicle, thus improving the ease of assembly.

Moreover, in accordance with the third aspect of the present invention, since the rear pillar includes a hollow part formed between the outer skin and the inner skin of the side member, and the roof side rail support member is fastened by a screw to the second metal insert member disposed within the hollow part, it becomes possible to fasten the roof side rail support member to the rear pillar from the outside of the vehicle, thus improving the ease of assembly.

Furthermore, in accordance with the fourth aspect of the present invention, since the mounting bracket having an upper part inclined rearward is provided on the inner faces in the vehicle width direction of the left and right rear pillars, the opposite side parts in the vehicle width direction of the back panel rising from the rear end of the floor panel are fixed to the mounting bracket, and the support bracket for the seat belt take-up device is provided on the inner face in the vehicle width direction of the rear pillar at an upper front position of the mounting bracket, it is possible to ensure a wide space in a rear part of a vehicle compartment, even for a small-sized vehicle such as a sports car, for a large seat to be disposed.

Moreover, in accordance with the fifth aspect of the present invention, not only can the strength and stiffness of the rear side frame and the upper frame toward a load in the up-and-down direction be enhanced since there are provided the left and right upper frames extending rearward from the upper ends of the left and right rear pillars and the left and right suspension struts providing a connection between the left and right upper frames and the left and right rear side frames in the up-and-down direction, but also the strength and stiffness of the rear side frame and the upper frame toward a load in the left-and-right direction can be enhanced since the front end of the rear side frame is fastened by a screw to two faces of the first metal insert member that are oriented in different inward and outward directions in the vehicle width direction, and the front end of the upper frame is fastened by a screw to two faces of the second metal insert member that are oriented in different inward and outward directions in the vehicle width direction.

Furthermore, in accordance with the sixth aspect of the present invention, since the left and right upper frames are linked by means of the cross member extending in the vehicle width direction via the upper ends of the left and right suspension struts, and the left and right rear side frames are linked by means of the lower cross member extending in the vehicle width direction via the lower ends of the left and right suspension struts, it is possible to form a birdcage-like structure having high strength and stiffness from the left and right rear side frames, the left and right upper frames, the left and right suspension struts, the upper cross member and the lower cross member.

Moreover, in accordance with the seventh aspect of the present invention, since the middle part in the vehicle width direction of the upper end of the back panel and the upper ends of the left and right suspension struts are linked by means of a brace that opens out in a V shape in going rearward, the strength and stiffness of the birdcage-like structure can be enhanced further.

Furthermore, in accordance with the eighth aspect of the present invention, since the middle part in the vehicle width direction of the lower cross member and the upper ends of the left and right suspension struts are linked by means of a brace that opens out in a V shape in going upward, the strength and stiffness of the birdcage-like structure can be enhanced further.

EXPLANATION OF REFERENCE NUMERALS AND SYMBOLS

10 Body floor
11 Floor panel
11*a* Bulge portion
13 Rear pillar
14 Back panel
15 Rear side frame
16 Outer skin
17 Inner skin
19 Side member
20 Outer skin
21 Inner skin
22 Mounting bracket
24 Support bracket
26 First metal insert member
29 Second metal insert member
31 Upper frame
35 Suspension strut
37 Upper cross member
38 Lower cross member
39 Brace
40 Brace
41 Roll bar (roof side rail support member)
42 Roof side rail

MODES FOR CARRYING OUT THE INVENTION

An embodiment of the present invention is explained below by reference to FIG. 1 to FIG. 6. The fore-and-aft direction, the left-and-right direction (vehicle width direction), and the up-and-down direction in the present specification are on the basis of an occupant seated on a driver's seat.

First Embodiment

Figure 1:
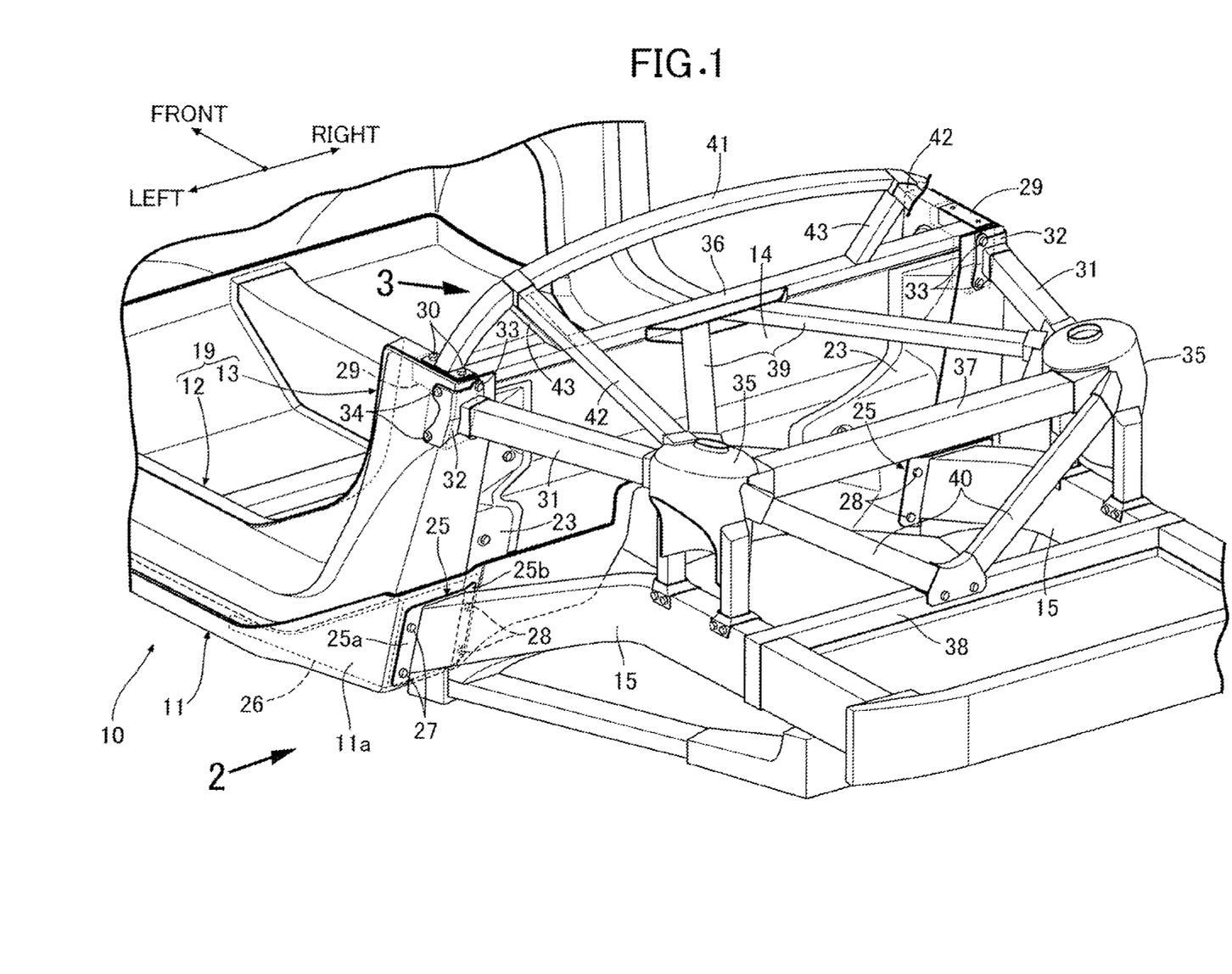
FIG. 1 is a perspective view of a body rear part of an automobile. (first embodiment)
Figure 2:
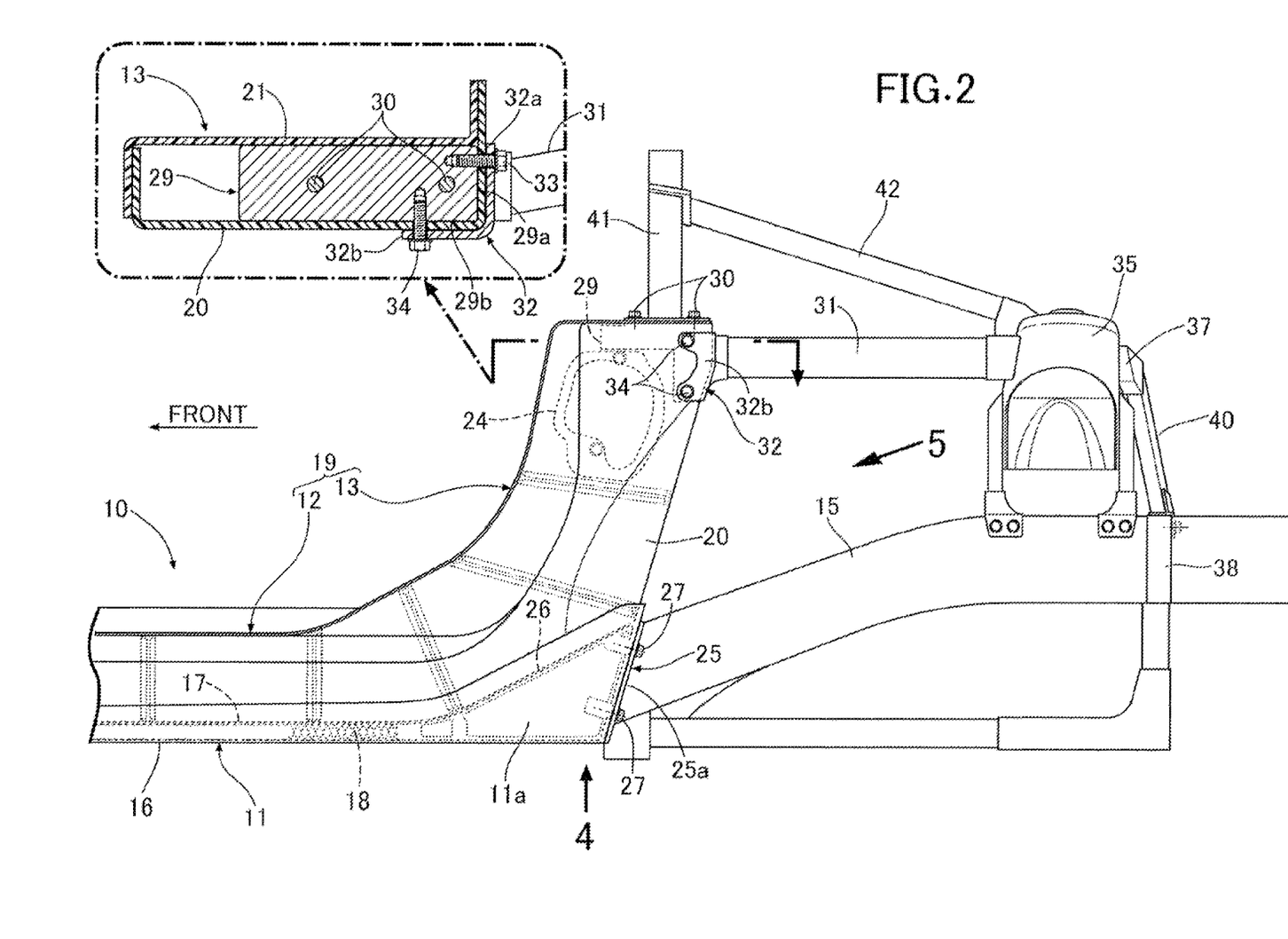
FIG. 2 is a view in the direction of arrow 2 in FIG. 1. (first embodiment)
Figure 3:
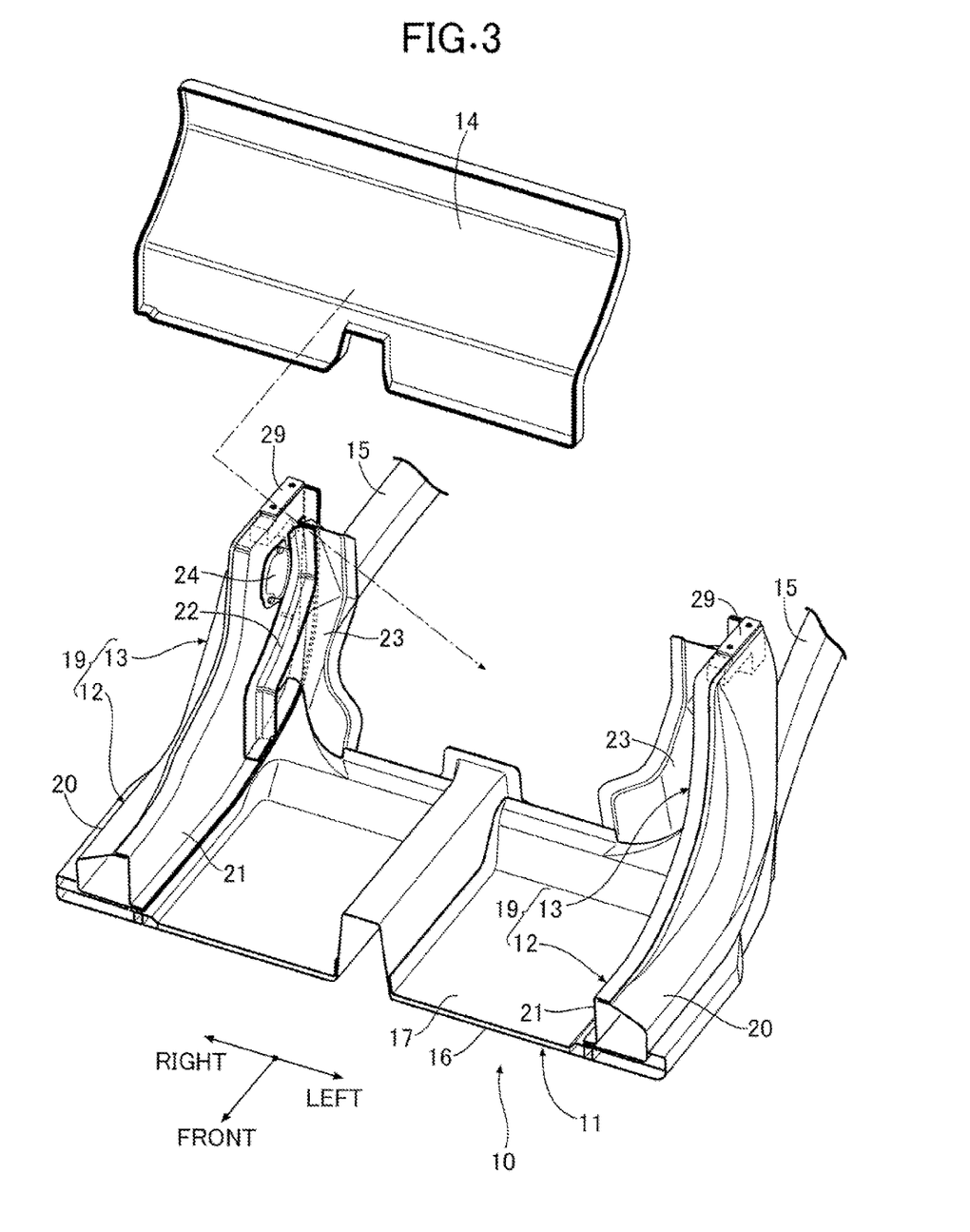
FIG. 3 is an exploded view in the direction of arrow 3 in FIG. 1. (first embodiment)

As shown in FIG. 1 to FIG. 3, a body floor 10 of a two seater sports automobile is basically formed from CFRP (carbon fiber-reinforced plastic), and includes a pair of left and right side sills 12 and 12 extending in the fore-and-aft direction along left and right side parts of a floor panel 11, and a pair of left and right rear pillars 13 and 13 rising upward to the rear from the rear end of the left and right side sills 12 and 12, and left and right side edges of a back panel 14 rising from the rear end of the floor panel 11 are joined to an inner face in the vehicle width direction of the left and right rear pillars 13 and 13. A pair of left and right rear side frames 15 and 15 made of metal extend rearward from left and right sides of the rear end of the floor panel 11.

The floor panel 11 is one in which a corrugated core 18 (see FIG. 6) is sandwiched between an outer skin 16 on the outside (lower side) of the vehicle body and an inner skin 17 on the inside (upper side) of the vehicle body, and a bulge portion 11a that bulges upward in a triangular shape when viewed from the side is formed on a rear part of the floor panel 11. The side sill 12 and the rear pillar 13 form a side member 19, and the side member 19 is formed so as to have a closed cross-section by joining an outer skin 20 on the outside in the vehicle width direction and an inner skin 21 on the inside in the vehicle width direction and is joined to an upper face of opposite side parts in the vehicle width direction of the floor panel 11 by adhesion. The rear pillar 13 rises obliquely upward to the rear so as to follow an upper face of the triangular bulge portion 11a of the floor panel 11.

Mounting brackets 22 and 22 bent into a crank shape are fixed to inner faces in the vehicle width direction of the left and right rear pillars 13 and 13, and the left and right side edges of the back panel 14 rising from the rear end of the floor panel 11 are fixed to rear faces of the mounting brackets 22 and 22. In this process, linking a rear face of the back panel 14 and the inner faces in the vehicle width direction of the rear pillars 13 and 13 via plate-shaped covers 23 and 23 blocks a gap generated by formation of the bulge portions 11a and 11a. Support brackets 24 and 24 supporting a seat belt take-up device (not illustrated) are provided on the inner faces in the vehicle width direction of the rear pillars 13 and 13 opposing a front face of an upper end part of the back panel 14 that is inclined from the lower front to the upper rear.

Figure 4:
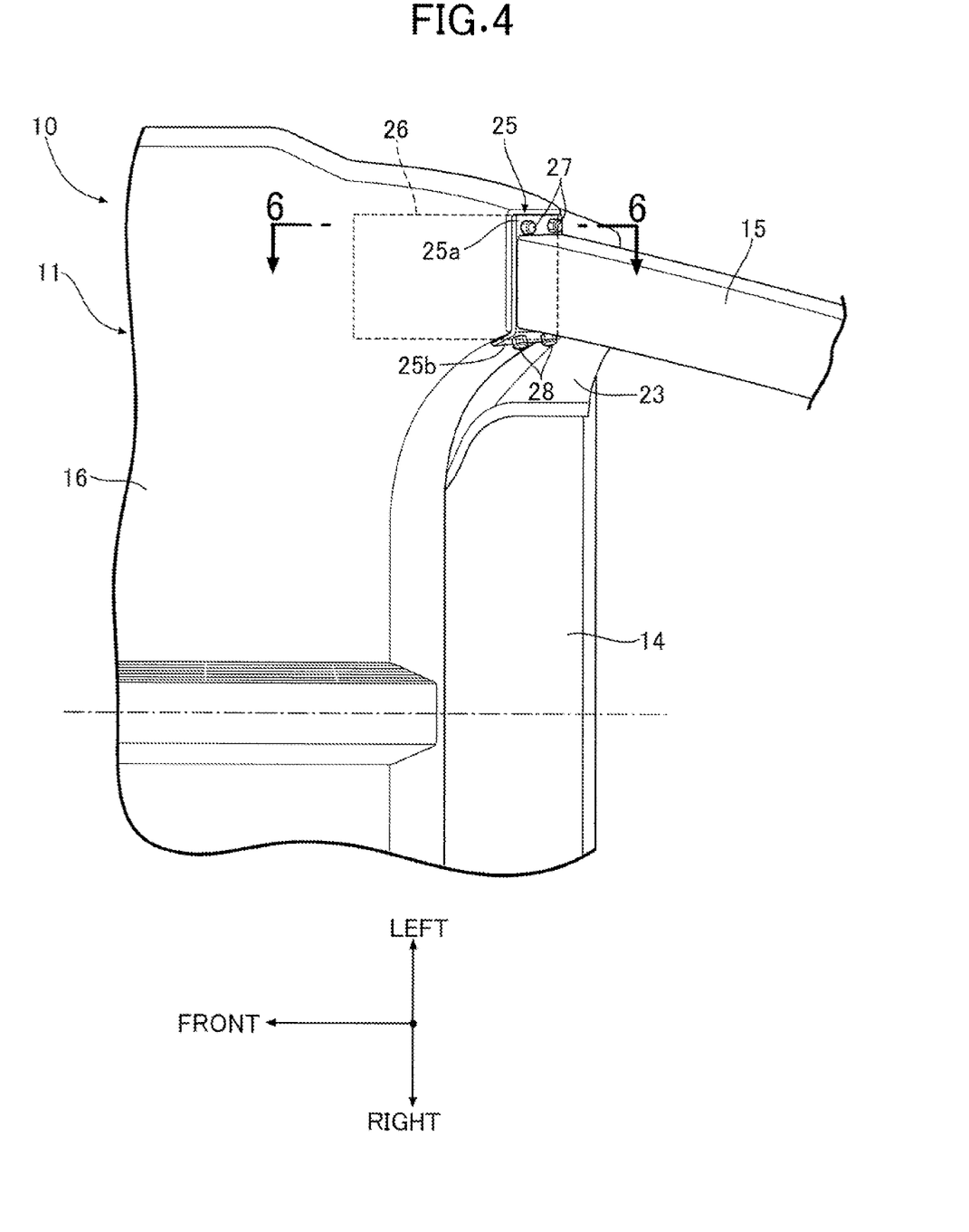
FIG. 4 is a view in the direction of arrow 4 in FIG. 2. (first embodiment)
Figure 5:
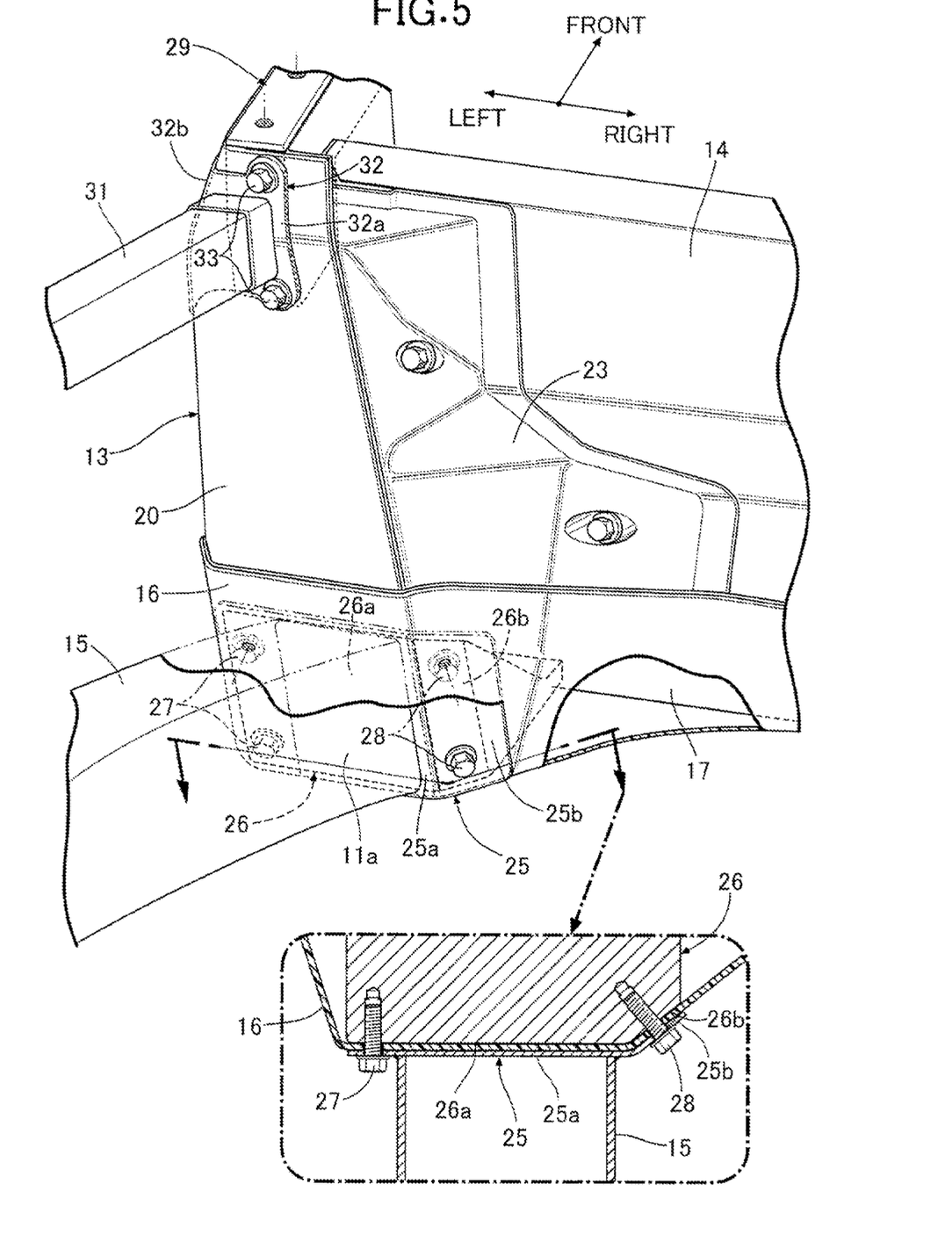
FIG. 5 is a view in the direction of arrow 5 in FIG. 2. (first embodiment)
Figure 6:
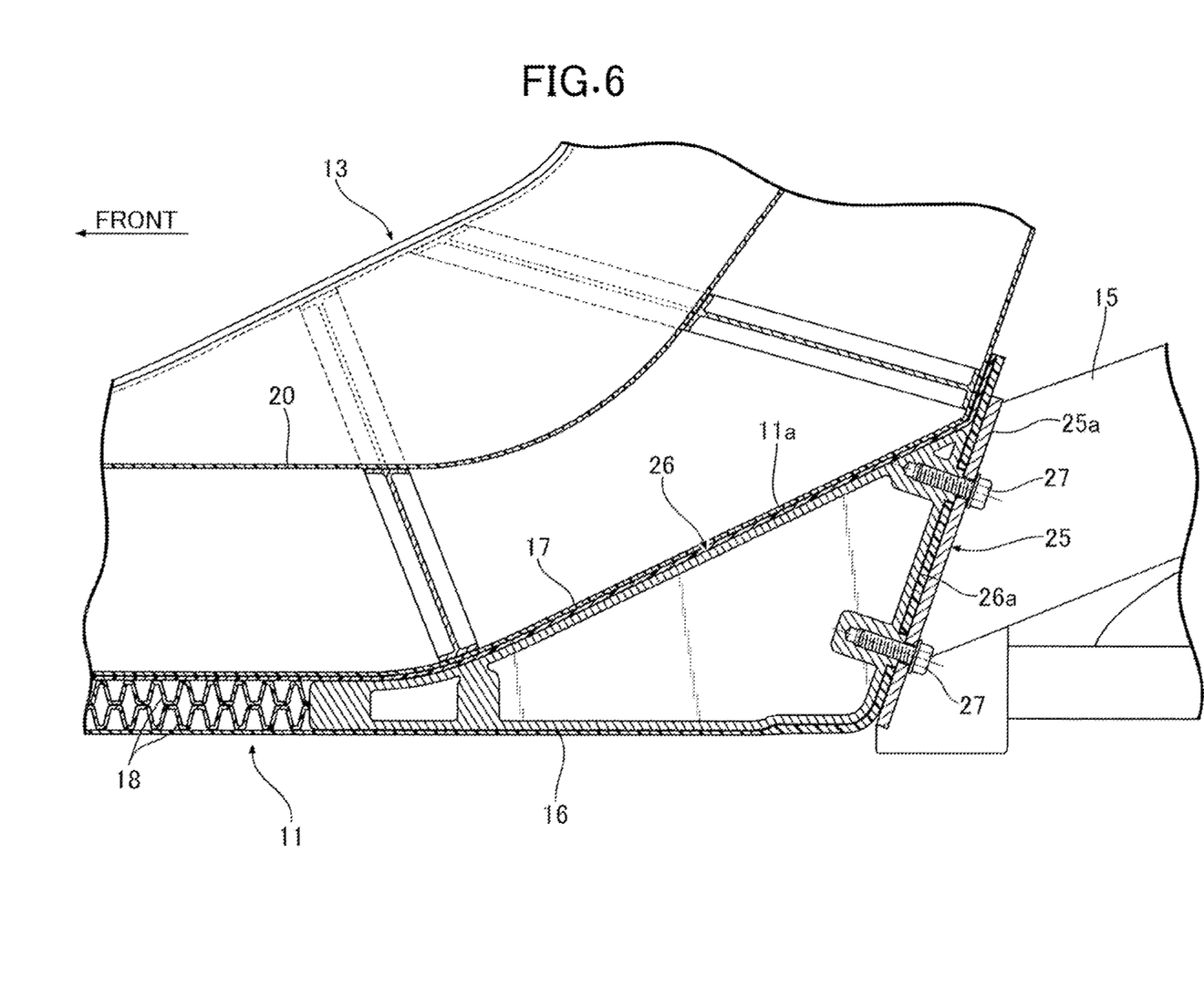
FIG. 6 is a sectional view along line 6-6 in FIG. 4. (first embodiment)

As shown in FIG. 4 to FIG. 6, the pair of left and right rear side frames 15 and 15 made of metal disposed in the fore-and-aft direction in a rear part of the vehicle body include plate-shaped mounting flanges 25 and 25 at the front end; the mounting flange 25 includes a forward facing main body portion 25a and an inclined portion 25b inclined forward and inward in the vehicle width direction from the inner end in the vehicle width direction of the main body portion 25a. Furthermore, a first metal insert member 26 made of metal formed into a triangular shape when viewed from the side is embedded in the interior of the bulge portion 11a of the floor panel 11, and in the first metal insert member 26 a rear facing first face 26a and a second face 26b facing rearward and inward in the vehicle width direction are formed so as to form a predetermined angle (see FIG. 5).

The mounting flange 25 of the rear side frame 15 is abutted against the first metal insert member 26 with the outer skin 16, which is bent back upward at the rear end of the floor panel 11, sandwiched therebetween, is fastened to the first face 26a of the first metal insert member 26 by means of two bolts 27 and 27 extending through the main body portion 25a of the mounting flange 25, and is fastened to the second face 26b of the first metal insert member 26 by means of two bolts 28 and 28 extending through the inclined portion 25b of the mounting flange 25.

As shown in FIG. 1, FIG. 2 and FIG. 5, a second metal insert member 29 made of metal and formed into a box shape is embedded in the upper end of rear pillar 13, and opposite end parts in the vehicle width direction of an arch-shaped roll bar 41 are fastened to upper faces of left and right second metal insert members 29 and 29 respectively by means of two bolts 30 and 30. Furthermore, a pair of left and right upper frames 31 and 31 are disposed in the fore-and-aft direction above the left and right rear side frames 15 and 15, a mounting flange 32 having an L-shaped cross section provided at the front end of each upper frame 31 is abutted against the second metal insert member 29 with the outer skin 20 of the rear pillar 13 sandwiched therebetween, two bolts 33 and 33 extending through the mounting flange 32 from the rear to the front are fastened to a rear-facing third face 29a of the second metal insert member 29, and two bolts 34 and 34 extending through the mounting flange 32 from the outside to the inside in the vehicle width direction are fastened to a fourth face 29b, facing outward in the vehicle width direction, of the second metal insert member 29 (see FIG. 2).

As shown in FIG. 1, intermediate parts in the fore-and-aft direction of the left and right rear side frames 15 and 15 and rear ends of the left and right upper frames 31 and 31 are linked via suspension struts 35 and 35 extending in the up-and-down direction. The upper end of a damper (not illustrated) of a rear suspension is supported on a lower face of an upper part of the suspension struts 35 and 35. A front cross member 36 extending in the vehicle width direction along the upper end of the back panel 14 provides a link between the upper ends of the left and right rear pillars 13 and 13, an upper cross member 37 extending in the vehicle width direction provides a link between the left and right suspension struts 35 and 35, and a lower cross member 38 extending in the vehicle width direction provides a link between the vicinities of the lower ends of the left and right suspension struts 35 and 35. An intermediate part in the vehicle width direction of the front cross member 36 and the left and right suspension struts 35 and 35 are linked by means of braces 39 and 39 that open out in a V-shape in going rearward, and an intermediate part in the vehicle width direction of the lower cross member 38 and the left and right suspension struts 35 and 35 are linked by means of braces 40 and 40 that open out in a V-shape in going upward.

A position close to an outer end part in the vehicle width direction of the roll bar 41 is linked to the left and right suspension struts 35 and 35 by means of a pair of left and right roof side rails 42 and 42 and is linked to the front cross member 36 by means of a pair of left and right stays 43 and 43.

The operation of the embodiment of the present invention having the above arrangement is now explained.

The body floor 10 made of CFRP includes the floor panel 11 having the left and right upwardly bulging bulge portions 11a and 11a formed on the rear parts on opposite side parts in the vehicle width direction, and the left and right side members 19 and 19 disposed in the fore-and-aft direction along the upper face on opposite side parts in the vehicle width direction of the floor panel 11 and having integrally formed therewith the left and right rear pillars 13 and 13 rising upward from the upper faces of the bulge portions 11a and 11a; since the front ends of the left and right rear side frames 15 and 15 are mounted on the rear parts of the left and right bulge portions 11a and 11a, and the roll bar 41 supporting the left and right roof side rails 42 and 42 is mounted on the upper parts of the rear pillars 13 and 13, by enhancing the strength and stiffness of the rear part of the body floor 10 made of CFRP by means of the bulge portions 11a and 11a and the rear pillars 13 and 13, it is possible to strongly support the rear side frames 15 and 15, the roll bar 41, and the roof side rails 42 and 42 on the rear part of the body floor 10, thus enabling the weight of a vehicle body to be lightened when applied to a sports car or a convertible car in particular.

Furthermore, since the bulge portion 11a includes a hollow part formed between the outer skin 16 and the inner skin 17 of the floor panel 11, and the rear side frame 15 is fastened by means of the bolts 27, 27; 28, 28 to the first metal insert member 26 having a triangular shape when viewed from the side and disposed in the hollow part, it becomes possible to fasten the rear side frame 15 to the bulge portion 11a from the outside of the vehicle, thus improving the ease of assembly.

Moreover, since the rear pillar 13 includes a hollow part formed between the outer skin 20 and the inner skin 21 of the side member 19, and the roll bar 41 is fastened to the box-shaped second metal insert member 29 disposed within the hollow part by means of the bolts 33, 33; 34, 34, it becomes possible to fasten the roll bar 41 to the rear pillar 13 from the outside of the vehicle, thus improving the ease of assembly.

Furthermore, since the mounting brackets 22 and 22 having upper parts inclined rearward are provided on the inner faces in the vehicle width direction of the left and right rear pillars 13 and 13, the opposite side parts in the vehicle width direction of the back panel 14 rising from the rear end of the floor panel 11 are fixed to the mounting brackets 22 and 22, and the support brackets 24 and 24 for the seat belt take-up device are provided on the inner faces in the vehicle width direction of the rear pillars 13 and 13 at upper front positions of the mounting brackets 22 and 22, it is possible to position the support brackets 24 and 24 for the seat belt take-up device as far rearward as possible, thus enabling a wide space to be ensured in a rear part of a vehicle compartment, even for a small-sized vehicle such as a sports car, for a large seat to be disposed.

Moreover, since there are provided the left and right upper frames 31 and 31 extending rearward from the upper ends of the left and right rear pillars 13 and 13 and the left and right suspension struts 35 and 35 providing a connection between the left and right upper frames 31 and 31 and the left and right rear side frames 15 and 15 in the up-and-down direction, the strength and stiffness of the rear side frames 15 and 15 and the upper frames 31 and 31 toward a load in the up-and-down direction can be enhanced. Furthermore, since the front end of the rear side frame 15 is fastened by means of the bolts 27, 27; 28, 28 to the first face 26a and the second face 26b respectively of the first metal insert member 26, which are oriented in different inward and outward directions in the vehicle width direction (see FIG. 5), and the front ends of the upper frames 31 and 31 are fastened by means of the bolts 33, 33; 34, 34 to the third face 29a and the fourth face 29b respectively of the second metal insert member 29, which are oriented in different inward and outward directions in the vehicle width direction (see FIG. 2), the strength and stiffness of the rear side frame 15 and the upper frame 31 toward a load in the left-and-right direction can be enhanced.

Moreover, since the left and right upper frames 31 and 31 are linked by means of the cross member 37 extending in the vehicle width direction via the upper ends of the left and right suspension struts 35 and 35, and the left and right rear side frames 15 and 15 are linked by means of the lower cross member 38 extending in the vehicle width direction via the lower ends of the left and right suspension struts 35 and 35, it is possible to form a birdcage-like structure having high strength and stiffness from the left and right rear side frames 15 and 15, the left and right upper frames 31 and 31, the left and right suspension struts 35 and 35, the upper cross member 37, and the lower cross member 38.

Furthermore, since the middle part in the vehicle width direction of the upper end of the back panel 14 and the upper ends of the left and right suspension struts 35 and 35 are linked by means of the braces 39 and 39 that open out in a V shape in going rearward and the middle part in the vehicle width direction of the lower cross member 38 and the upper ends of the left and right suspension struts 35 and 35 are linked by means of the braces 40 and 40 that open out in a V shape in going upward, the strength and stiffness of the birdcage-like structure can be enhanced further.

An embodiment of the present invention is explained above, but the present invention may be modified in a variety of ways as long as the modifications do not depart from the spirit and scope thereof.

For example, in the embodiment the front ends of the left and right roof side rails 42 and 42 are supported on the roll bar 41, but the roof side rail support member is not limited to the roll bar 41.

The invention claimed is:

1. A body structure of an automobile in which left and right rear side frames and left and right roof side rails are mounted on a rear part of a body floor made of CFRP,
wherein the body floor comprises a floor panel having a bulge portion bulging upward formed on a rear part of opposite side parts in a vehicle width direction, and a side member disposed in a fore-and-aft direction along an upper face of the opposite side parts in the vehicle width direction of the floor panel and having formed integrally therewith a rear pillar rising upward from an upper face of the bulge portion, a front end of the rear side frame is mounted on the rear part of the bulge portion, and a roof side rail support member supporting the roof side rails is mounted on an upper part of the rear pillar,
the bulge portion comprises a hollow part formed between an outer skin and an inner skin of the floor panel, and the rear side frame is fastened by a screw to a first metal insert member disposed within the hollow part and having a triangular shape when viewed from a side, and
the rear pillar comprises another hollow part formed between an outer skin and an inner skin of the side member, and the roof side rail support member is fastened by a screw to a second metal insert member disposed within the another hollow part.

2. The body structure of an automobile according to claim 1, wherein a mounting bracket whose upper part is inclined rearward is provided on an inner face in the vehicle width direction of the left and right rear pillars, opposite side parts in the vehicle width direction of a back panel rising from a rear end of the floor panel are fixed to the mounting bracket, and a support bracket for a seat belt take-up device is provided at an upper front position of the mounting bracket on the inner face in the vehicle width direction of the rear pillar.

3. The body structure of an automobile according to claim 2, further comprising left and right upper frames extending rearward from upper ends of the left and right rear pillars, and left and right suspension struts connecting the left and right upper frames and the left and right rear side frames in an up-and-down direction, the front end of the rear side frame is fastened by a screw to two faces oriented in different inward and outward directions in the vehicle width direction of the first metal insert member, and a front end of the upper frame is fastened by a screw to two faces oriented in different inward and outward directions in the vehicle width direction of the second metal insert member.

4. The body structure of an automobile according to claim 3, wherein the left and right upper frames are linked by an upper cross member extending in the vehicle width direction via upper ends of the left and right suspension struts, and the left and right rear side frames are linked by a lower cross member extending in the vehicle width direction via lower ends of the left and right suspension struts.

5. The body structure of an automobile according to claim 4, wherein a middle part in the vehicle width direction of an upper end of the back panel and the upper ends of the left and right suspension struts are linked via braces that opens out in a V-shape in going rearward.

6. The body structure of an automobile according to claim 4, wherein a middle part in the vehicle width direction of the lower cross member and the upper ends of the left and right suspension struts are linked via braces that opens out in a V-shape in going upward.

* * * * *